(12) United States Patent
Kanayama et al.

(10) Patent No.: US 7,619,031 B2
(45) Date of Patent: Nov. 17, 2009

(54) LOW HEAT STORING THERMOPLASTIC RESIN COMPOSITION AND MOLDING THEREOF

(75) Inventors: Yuuichi Kanayama, Chuo-ku (JP); Kenichi Noguchi, Chuo-ku (JP); Yasuo Takahashi, Chuo-ku (JP); Hideyuki Kurimoto, Chuo-ku (JP)

(73) Assignee: Techno Polymer Co., Ltd., Tokyo (JP)

( * ) Notice: Subject to any disclaimer, the term of this patent is extended or adjusted under 35 U.S.C. 154(b) by 534 days.

(21) Appl. No.: 10/522,725

(22) PCT Filed: Aug. 6, 2003

(86) PCT No.: PCT/JP03/09997

§ 371 (c)(1),
(2), (4) Date: Sep. 22, 2005

(87) PCT Pub. No.: WO2004/015014

PCT Pub. Date: Feb. 19, 2004

(65) Prior Publication Data

US 2006/0128862 A1    Jun. 15, 2006

(30) Foreign Application Priority Data

Aug. 7, 2002   (JP)   .............................. 2002-230328
Jan. 8, 2003   (JP)   ................... 2003-2618
Feb. 19, 2003  (JP)   ................. 2003-41757

(51) Int. Cl.
   *C09D 5/08*    (2006.01)
(52) U.S. Cl. ..................................................... 524/507
(58) Field of Classification Search .................. 524/407
   See application file for complete search history.

(56) References Cited

U.S. PATENT DOCUMENTS

| | | | | |
|---|---|---|---|---|
| 4,424,292 A | * | 1/1984 | Ravinovitch et al. | 524/88 |
| 4,546,045 A | * | 10/1985 | Elias | 428/424.6 |
| 4,895,904 A | * | 1/1990 | Allingham | 523/135 |
| 5,080,718 A | * | 1/1992 | Sullivan et al. | 106/453 |
| 5,122,291 A | * | 6/1992 | Wolff et al. | 252/62 |
| 5,250,112 A | * | 10/1993 | Wussow et al. | 106/453 |
| 5,306,778 A | * | 4/1994 | Ishida et al. | 525/310 |
| 5,650,461 A | * | 7/1997 | Wasserman et al. | 524/441 |
| 5,811,180 A | * | 9/1998 | Berdahl | 428/324 |
| 5,962,143 A | * | 10/1999 | Krauthauser et al. | 428/425.1 |
| 5,977,017 A | * | 11/1999 | Golden | 502/302 |
| 6,028,134 A | * | 2/2000 | Zhang et al. | 524/406 |
| 6,171,383 B1 | * | 1/2001 | Sakoske et al. | 106/479 |
| 6,174,360 B1 | * | 1/2001 | Sliwinski et al. | 106/453 |
| 6,221,147 B1 | * | 4/2001 | Sakoske et al. | 106/479 |
| 6,294,010 B1 | * | 9/2001 | Pfaff et al. | 106/415 |
| 6,366,397 B1 | * | 4/2002 | Genjima et al. | 359/359 |
| 6,454,848 B2 | * | 9/2002 | Sliwinski et al. | 106/459 |
| 6,485,557 B1 | * | 11/2002 | Swiler | 106/479 |
| 6,541,112 B1 | * | 4/2003 | Swiler et al. | 428/402 |
| 6,734,224 B2 | * | 5/2004 | Ishihara et al. | 523/136 |
| 2001/0011116 A1 | * | 8/2001 | Kurata et al. | 525/67 |
| 2003/0031850 A1 | * | 2/2003 | Scharnke et al. | 428/221 |
| 2003/0187132 A1 | * | 10/2003 | Hodgkinson et al. | 524/588 |
| 2003/0215627 A1 | * | 11/2003 | Rosenberger et al. | 428/327 |

FOREIGN PATENT DOCUMENTS

| JP | 10101896 A | * | 4/1998 |
|---|---|---|---|
| JP | 2000256529 A | * | 9/2000 |
| JP | 2001-164082 | | 6/2001 |
| JP | 2002-69326 | | 3/2002 |

OTHER PUBLICATIONS

Machine translation of JP 2000-2565290.*
Machine translation of JP 10-101896.*

* cited by examiner

*Primary Examiner*—Mark Eashoo
*Assistant Examiner*—Noah Frank
(74) *Attorney, Agent, or Firm*—Nixon & Vanderhye P.C.

(57) ABSTRACT

A low-heat accumulating thermoplastic resin composition containing 100 parts by mass of a thermoplastic resin [A] and 0.1 to 15 parts by mass of an inorganic pigment [B] having an infrared-reflecting property, and a molded product comprising the composition. The low-heat accumulating thermoplastic resin composition of the present invention is capable of providing a dark-colored molded product exhibiting a less heat accumulation as well as excellent weather resistance and impact resistance.

23 Claims, No Drawings

LOW HEAT STORING THERMOPLASTIC RESIN COMPOSITION AND MOLDING THEREOF

This application is the US national phase of international application PCT/JP2003/009997 filed 6 Aug. 2003 which designated the U.S. and claims priority of JP 2002-230328, filed 7 Aug. 2002; JP 2003-2618, filed 8 Jan. 2003 and JP 2003-41757, filed 19 Feb. 2003, the entire contents of each of which are hereby incorporated by reference.

TECHNICAL FIELD

The present invention relates to a low-heat accumulating thermoplastic resin composition, and more particularly, to a low-heat accumulating thermoplastic resin composition capable of providing a dark-colored molded product exhibiting a less heat accumulation and excellent weather resistance and impact resistance, as well as a molded product using the composition.

BACKGROUND ARTS

Thermoplastic resins have been extensively used in various applications. Colored resin products have been obtained by molding a resin composition containing the thermoplastic resin and a colorant such as dyes and pigments. For example, black-colored resin products are produced from such a resin composition containing carbon black as the colorant. However, when such resin products containing carbon black are used in the applications exposed to sunlight, the temperature of the molded products tend to be undesirably increased due to a large heat absorption thereof, resulting in problems such as occurrence of deformation or shrinkage thereof. Also, when the resin products containing carbon black are used as interior trims or parts of automobiles, an inside temperature thereof tends to be undesirably increased, resulting in problems such as poor cooling effect. Therefore, it has been attempted to achieve black coloration of the resin products by utilizing the combination of organic pigments or dyes on the basis of the principle of three primary colors instead of the carbon black. However, this attempt has failed to attain sufficient coloring property and weather resistance.

On the other hand, when a heat-resistant rubber-reinforced resin is used as the thermoplastic resin, although resin products produced therefrom show a less deformation or shrinkage upon exposure to a high temperature condition, such a resin tends to be unsatisfactory in moldability, and it may be difficult to obtain molded products having a large scale or a complicated structure therefrom.

DISCLOSURE OF THE INVENTION

As a result of the present inventors' earnest studies for solving the above conventional problems, there has been found a low-heat accumulating thermoplastic resin composition having an excellent moldability which is capable of providing a molded product exhibiting a less heat accumulation as well as excellent weather resistance and impact resistance. The present invention has been attained on the basis of the above finding.

Thus, in a first aspect of the present invention, there is provided a low-heat accumulating thermoplastic resin composition comprising 100 parts by mass of a thermoplastic resin [A] and 0.1 to 15 parts by mass of an inorganic pigment [B] having an infrared-reflecting property.

In one preferred embodiment of the present invention, said low-heat accumulating thermoplastic resin composition comprises 100 parts by mass of a rubber-reinforced thermoplastic resin [A] which comprises a rubber-reinforced vinyl-based resin (A1) produced by polymerizing a vinyl-based monomer component (b) in the presence of a rubber polymer (a) or a mixture of the rubber-reinforced vinyl-based resin (A1) and a (co)polymer (A2) of a vinyl-based monomer component wherein a content of the rubber polymer (a) in the thermoplastic resin [A] is in the range of 3 to 40% by weight; and 0.1 to 15 parts by mass of an inorganic pigment [B] having an infrared-reflecting property.

In the other preferred embodiment of the present invention, said low-heat accumulating thermoplastic resin composition comprises 100 parts by mass of a thermoplastic resin [A] and 0.1 to 15 parts by mass of an inorganic pigment [B] having an infrared-reflecting property, wherein a molded product produced from the composition exhibits a temperature rise of not more than 50° C. as measured under the following experimental conditions:

[Experimental Conditions]

When a molded product produced from the above composition which has a length of 80 mm, a width of 55 mm and a thickness of 2.5 mm is placed in a chamber whose temperature and relative humidity are controlled to 25±2° C. and 50±5% RH, respectively, and a surface of the molded product is irradiated with light from a height of 200 mm above the molded product using an infrared lamp with an output power of 100 W for 60 min, the temperature rise is defined as a difference between a temperature of the surface of the molded product measured after the light irradiation and an initial temperature thereof measured before the light irradiation.

In the still other preferred embodiment of the present invention, said low-heat accumulating thermoplastic resin composition further comprises 0.01 to 10 parts by mass of an inorganic pigment [C] based on 100 parts by mass of the thermoplastic resin [A]. In this case, the following conditions are preferably satisfied:

(i) said inorganic pigment [B] satisfies the requirement that a molded product comprising 100 parts by mass of a block-type polypropylene and 0.5 part by mass of the inorganic pigment [B] exhibits an L value of less than 40;

(ii) said inorganic pigment [C] satisfies the requirement that a molded product comprising 100 parts by mass of a block-type polypropylene and 0.5 part by mass of the inorganic pigment [C] exhibits an L value of not less than 40; and (iii) a molded product comprising the above low-heat accumulating thermoplastic resin composition exhibits an L value of not more than 40, and a temperature rise of not more than 50° C. when the molded product is irradiated with infrared rays.

The present invention will be described in detail below. Examples of the thermoplastic resin [A] used in the present invention may include, but is not particularly limited to, rubber-reinforced vinyl-based resins, polyolefin-based resins such as polyethylene-based resins, polypropylene-based resins and ethylene-α-olefin-based resins, polyvinyl chloride resins, polyvinylidene chloride resins, polyvinyl acetate resins, saturated polyester-based resins, acrylic resins such as (co)polymers of (meth)acrylic ester compounds, fluororesins, styrene-based resins such as (co)polymers of aromatic vinyl compounds, ethylene-vinyl acetate resins and acrylonitrile-styrene resins. These thermoplastic resins may be used singly or in the combination of any two or more thereof. Of these thermoplastic resins, preferred are rubber-reinforced vinyl-based resins, polyvinylidene chloride resins and acrylic resins, and more preferred are rubber-reinforced vinyl-based resins.

The rubber-reinforced vinyl-based resins are not particularly restricted. For example, there may be singly used the rubber-reinforced vinyl-based resin (A1) obtained by polymerizing a vinyl-based monomer component (b) in the presence of a rubber polymer (a), or there may also be used a mixture of the rubber-reinforced vinyl-based resin (A1) and a (co)polymer (A2) of a vinyl-based monomer component.

Examples of the rubber polymer (a) may include diene-based (co)polymers such as polybutadiene, styrene-butadiene copolymers, butadiene-acrylonitrile copolymers, styrene-butadiene-styrene block copolymers and styrene-isoprene-styrene block copolymers as well as hydrogenated products thereof; ethylene-α-olefin copolymers such as ethylene-propylene-non-conjugated diene copolymers, ethylene-buten-1-non-conjugated diene copolymers and isobutylene-isoprene copolymers; and non-diene-based (co)polymers such as acrylic rubbers, polyurethane rubbers and silicone rubbers. Further, the above hydrogenated products of styrene-butadiene block copolymers may include, in addition to the hydrogenated products of the above block copolymers themselves, hydrogenated products of random copolymers comprising styrene blocks and styrene-butadiene blocks, etc. These rubber polymers (a) may be used singly or in the form of a mixture of any two or more thereof. In the present invention, in the case where the rubber-reinforced vinyl-based resins are obtained by emulsion polymerization, latex-like rubber polymers are preferably used.

When using the latex-like rubber polymers, the weight-average particle size of the rubber polymer (a) in the latex is preferably in the range of 500 to 8000 Å, more preferably 1000 to 5000 Å and still more preferably 1000 to 4000 Å. When the weight-average particle size of the rubber polymer (a) is less than 500 Å, the resultant molded product tends to be deteriorated in impact resistance. On the other hand, when the weight-average particle size of the rubber polymer (a) is more than 8000 Å, the resultant molded product tends to be deteriorated in surface gloss.

Usually, the rubber polymer (a) is preferably produced by an emulsion polymerization method in the consideration of well-controlled average particle size thereof, etc. In this case, the average particle size of the rubber polymer (a) may be controlled by appropriately selecting production conditions such as kind and amount of emulsifier, kind and amount of initiator, polymerization time, polymerization temperature and stirring conditions. In addition, as the other methods for controlling the particle size distribution of the rubber polymer (a), there may be used the method of blending at least two kinds of rubber polymers (a) that are different in particle size from each other.

The vinyl-based monomer component (b) used for forming the rubber-reinforced vinyl-based resin (A1) is not particularly restricted. Examples of the vinyl-based monomer component (b) may include (meth)acrylic ester compounds, cyanided vinyl compounds, maleimide-based compounds and acid anhydrides. These compounds may be used singly or in the combination of any two or more thereof.

Examples of the aromatic vinyl compounds may include styrene, α-methyl styrene, o-methyl styrene, p-methyl styrene, t-butyl styrene, vinyl toluene, methyl-α-methyl styrene, divinyl benzene and styrene bromide. Of these aromatic vinyl compounds, preferred are styrene, α-methyl styrene and p-methyl styrene. These aromatic vinyl compounds may be used singly or in the combination of any two or more thereof.

Examples of the (meth)acrylic ester compounds may include methyl methacrylate, ethyl methacrylate, propyl methacrylate, butyl methacrylate, methyl acrylate, ethyl acrylate, propyl acrylate and butyl acrylate. Of these (meth)acrylic ester compounds, preferred is methyl methacrylate. These (meth)acrylic ester compounds may be used singly or in the combination of any two or more thereof.

Examples of the cyanided vinyl compounds may include acrylonitrile and methacrylonitrile. Of these cyanided vinyl compounds, preferred is acrylonitrile. Also, these cyanided vinyl compounds may be used singly or in the combination of any two or more thereof.

Examples of the maleimide-based compounds may include maleimide, N-methyl maleimide, N-butyl maleimide, N-phenyl maleimide, N-(2-methylphenyl)maleimide, N-(4-hydroxyphenyl)maleimide and N-cyclohexyl maleimide. Of these maleimide-based compounds, preferred is N-phenyl maleimide. Also, these maleimide-based compounds may be used singly or in the combination of any two or more thereof. Meanwhile, the maleimide-based compounds may be introduced, for example, by such a method of copolymerizing maleic anhydride with the rubber polymer and then subjecting the resultant copolymer to imidization.

Examples of the acid anhydride may include maleic anhydride, itaconic anhydride and citraconic anhydride. Also, these acid anhydrides may be used singly or in the combination of any two or more thereof.

The vinyl-based monomer component (b) preferably contains the aromatic vinyl compound. In this case, the weight ratio ((b1)/(b2)) of the aromatic vinyl compound (b1) to the other vinyl-based monomers (b2) is preferably (10 to 95)% by mass/(5 to 90)% by mass, more preferably (20 to 85)% by mass/(15 to 80)% by mass with the proviso that the total amount of these components (b1) and (b2) is 100% by mass. When the amount of the aromatic vinyl compound (b1) used is too small, the resultant composition tends to be deteriorated in moldability, and the molded product produced therefrom tends to be deteriorated in aesthetic appearance. When the amount of the aromatic vinyl compound (b1) used is too large, the effects due to use of the vinyl-based monomer (b2) may fail to be sufficiently exhibited. Meanwhile, as the vinyl-based monomer (b2), there is preferably used at least one compound selected from the group consisting of (meth)acrylic ester compounds, cyanided vinyl compounds and maleimide compounds.

Also, when a molded product produced from the composition containing no inorganic pigment [B] among the components constituting the composition of the present invention, namely a molded product produced from the thermoplastic [A] solely, exhibits a transparency or a transparent feeling, the molded product produced from the composition containing the inorganic pigment [B] according to the present invention can be improved in coloring property and coloring clarity due to the inorganic pigment [B]. The transparency or transparent feeling of the resultant molded product can be achieved by matching or approaching a refractive index of the rubber polymer (a) to that of a polymer of the vinyl-based monomer (b). In order to match or approach the refractive index of the rubber polymer (a) to that of a polymer of the vinyl-based monomer (b), the vinyl-based monomer component (b) preferably contains a (meth)acrylic ester compound. The amount of the (meth)acrylic ester compound used may be selected so as to reduce a difference between the refractive indices of the vinyl monomer component (b) containing the (meth)acrylic ester compound and the rubber polymer (a). In addition, in this case, the (meth)acrylic ester compound is preferably methyl methacrylate.

In the above case, as the (meth)acrylic ester compound and the other vinyl-based monomers, there may be used at least one compound selected from the group consisting of aromatic vinyl compounds, cyanided vinyl compounds and maleimide compounds.

Meanwhile, as described above, the rubber-reinforced vinyl-based resin may comprise the rubber-reinforced vinyl-based resin (A1) solely, or may be in the form of a mixture comprising the rubber-reinforced vinyl-based resin (A1) and the (co)polymer (A2) obtained by polymerizing a vinyl-based monomer component. The (co)polymer (A2) may be a polymer obtained by polymerizing a component having the same composition as that of the vinyl-based monomer component (b) used for forming the above rubber-reinforced vinyl-based resin (A1), a polymer obtained by polymerizing the same monomer component as the vinyl-based monomer component (b) which however has a different composition therefrom, or a polymer obtained by polymerizing a different monomer component from the vinyl-based monomer component (b) which has a different composition therefrom. Further, the (co)polymer (A2) may contain 2 or more kinds of these polymers.

In addition, the following monomer compounds may be copolymerized as long as the resultant copolymer adversely affects the objects of the present invention. Examples of the monomer compounds may include vinyl compounds containing at least one functional group selected from the group consisting of epoxy, hydroxyl, amino, amido, carboxyl and oxazoline. Examples of the vinyl compounds may include glycidyl methacrylate, glycidyl acrylate, 2-hydroxyethyl methacrylate, 2-hydroxyethyl acrylate, acrylamide, acrylic acid, methacrylic acid and vinyl oxazoline.

Here, in any case where the rubber-reinforced vinyl-based resin comprises the rubber-reinforced vinyl-based resin (A1) solely or the mixture of the rubber-reinforced vinyl-based resin (A1) and the (co)polymer (A2) obtained by polymerizing a vinyl-based monomer component, the content of the rubber polymer (a) in the composition of the present invention is preferably in the range of 3 to 40% by mass and more preferably 5 to 35% by mass. When the content of the rubber polymer (a) is too small, the resultant composition tends to be deteriorated in impact resistance. When the content of the rubber polymer (a) is too large, the resultant composition tends to be deteriorated in hardness and rigidity.

Next, the processes for producing the rubber-reinforced vinyl-based resin (A1) and the (co)polymer (A2) are explained.

The rubber-reinforced vinyl-based resin (A1) may be produced by polymerizing the vinyl-based monomer component (b) in the presence of the rubber polymer (a) preferably by emulsion polymerization method, solution polymerization method or bulk polymerization method.

In the case where the rubber-reinforced vinyl-based resin (A1) is produced by emulsion polymerization method, there may be used a polymerization initiator, a chain transfer agent (molecular weight modifier), an emulsifier, water, etc.

Meanwhile, the rubber polymer (a) and the vinyl-based monomer component (b) used for producing the rubber-reinforced vinyl-based resin (A1) may be added to the reaction system in such a manner that the vinyl-based monomer component is added at one time, separately as divided parts, or continuously in the presence of a whole amount of the rubber polymer. These addition methods may also be used in combination. In addition, a whole or part of the rubber polymer may be added and polymerized in the course of the polymerization reaction.

Examples of the polymerization initiator may include redox-based polymerization initiators obtained by combining organic hydroperoxides such as typically cumene hydroperoxide, diisopropylbenzene hydroperoxide and p-methane hydroperoxide with a reducing agent such as typically sugar-containing pyrophosphoric acid compounds and sulfoxylate compounds, and persulfates such as potassium persulfate, peroxides such as benzoyl peroxide (BPO), lauroyl peroxide, t-butyl peroxylaurate and t-butyl peroxymonocarbonate. These polymerization initiators may be used singly or in the combination of any two or more thereof. These polymerization initiators may also be added to the reaction system at one time or continuously. In addition, the amount of the polymerization initiator used is usually in the range of 0.1 to 1.5% by mass and preferably 0.2 to 0.7% by mass based on the whole amount of the above vinyl-based monomer component (b).

Examples of the chain transfer agent may include mercaptans such as octyl mercaptan, n-dodecyl mercaptan, t-dodecyl mercaptan, n-hexyl mercaptan, n-hexadecyl mercaptan, n-tetradecyl mercaptan and t-tetradecyl mercaptan, terpinolene and dimers of α-methyl styrene. These chain transfer agents may be used singly or in the combination of any two or more thereof. The amount of the chain transfer agent used is usually in the range of 0.05 to 2.0% by mass based on the whole amount of the above vinyl-based monomer component (b).

Examples of the emulsifier used in the emulsion polymerization may include sulfuric esters of higher alcohols, alkylbenzenesulfonic acid salts such as sodium dodecylbenzenesulfonate, aliphatic sulfonic acid salts such as sodium laurylsulfate, higher aliphatic carboxylates, anionic surfactants such as phosphoric acid-based surfactants, and nonionic surfactants such as alkyl esters or alkyl ethers of polyethylene glycol. These emulsifiers may be used singly or in the combination of any two or more thereof. The amount of the emulsifier used is usually in the range of 0.3 to 5.0% by mass based on the whole amount of the above vinyl-based monomer component (b).

The latex produced by the emulsion polymerization may be usually purified by solidifying the latex with a coagulating agent to obtain particles of the polymer component, and water-washing and then drying the resultant particles. Examples of the coagulating agent may include inorganic salts such as calcium chloride, magnesium sulfate, magnesium chloride and sodium chloride, inorganic acids such as sulfuric acid and hydrochloric acid, and organic acids such as acetic acid and lactic acid.

The production process using solution polymerization or bulk polymerization may be performed by known methods.

The graft percentage of the rubber-reinforced vinyl-based resin (A1) is preferably 10 to 200%, more preferably 15 to 150% by mass and especially preferably 20 to 100%. When the graft percentage of the rubber-reinforced vinyl-based resin (A1) is less than 10% by mass, the molded product obtained from the resin composition of the present invention tends to suffer from poor appearance and deteriorated impact strength. When the graft percentage of the rubber-reinforced vinyl-based resin (A1) is more than 200% by mass, the resultant composition tends to be deteriorated in processability.

Here, the graft percentage is the value calculated from the following formula:

$$\text{Graft Percentage (\%)} = \{(y-x)/x\} \times 100$$

wherein x is a weight (g) of a rubber component contained in 1 g of the rubber-reinforced vinyl-based resin (A1); and y is a weight (g) of a methyl ethyl ketone-insoluble component as measured by dissolving 1 g of the above copolymer resin (A1) in methyl ethyl ketone.

The intrinsic viscosity [η] of an acetone-soluble component contained in the rubber-reinforced vinyl-based resin (A1) as measured at 30° C. in methyl ethyl ketone, is preferably 0.1 to 1.0 dL/g, more preferably 0.2 to 0.9 dL/g, especially preferably 0.3 to 0.7 dL/g. When the intrinsic viscosity [η] of the acetone-soluble component lies in the above-specified range, the obtained composition is excellent in moldability (fluidity), and the molded product obtained from the composition of the present invention is also excellent in impact resistance.

The graft percentage (%) and the intrinsic viscosity [η] can be readily controlled by varying kinds and amounts of the polymerization initiator, chain transfer agent, emulsifier, solvent, etc., as well as polymerization time and polymerization temperature which are used upon polymerization of the above rubber-reinforced vinyl-based resin (A1).

The above (co)polymer (A2) may be produced, for example, by bulk polymerization, solution polymerization, emulsion polymerization, suspension polymerization, etc.

The intrinsic viscosity [η] of an acetone-soluble component contained in the (co)polymer (A2) as measured at 30° C. in methyl ethyl ketone, is preferably 0.1 to 1.0 dL/g and more preferably 0.15 to 0.7 dL/g. When the intrinsic viscosity [η] of the acetone-soluble component lies in the above-specified range, the obtained composition is well-balanced between moldability and impact resistance. Meanwhile, the intrinsic viscosity [η] of an acetone-soluble component contained in the (co)polymer (A2) may also be readily controlled by the same method as that for the rubber-reinforced vinyl-based resin (A1).

The intrinsic viscosity [η] of an acetone-soluble component contained in the rubber-reinforced vinyl-based resin as measured at 30° C. in methyl ethyl ketone, is preferably 0.1 to 0.8 dL/g and more preferably 0.15 to 0.7 dL/g. When the intrinsic viscosity [η] of the acetone-soluble component lies in the above-specified range, the obtained composition is well-balanced between moldability and impact resistance.

The inorganic pigment [B] having an infrared-reflecting property as used in the present invention is not particularly restricted as long as the pigment hardly absorbs infrared rays. Examples of the preferred inorganic pigment [B] may include compounds containing at least one element selected from the group consisting of Fe, Cr, Mn, Cu, Co and Ni. Of these compounds, more preferred are oxides and composite oxides of the above-specified elements, etc. Specific examples of the preferred oxides and composite oxides may include FeO, FeO(OH), $Fe_2O_3$, CrO, $Cr_2O_3$, $Cr_2O_3 \cdot 2H_2O$, MnO, $Mn_2O_3$, $MnO_2$, CuO, $Cu_2O$, CoO, $CoO \cdot Al_2O_3$, $Fe(Fe, Cr)_2O_4$, $(Co, Fe)(Fe, Cr)_2O_4$, $Cu(Cr, Mn)_2O_4$, $(Cu, Fe, Mn)(Fe, Cr, Mn)_2O_4$, $(Fe, Zn)(Fe, Cr)_2O_4$, $(Fe, Zn)Fe_2O_4$, $CoAl_2O_4$, $Co(Al, Cr)_2O_4$, $Cr_2O_3$: $Fe_2O_3$ and $(Ni, Co, Fe)(Fe, Cr)_2O_4$. Of these oxides and composite oxides, preferred are $Cr_2O_3$: $Fe_2O_3$, $(Cu, Fe, Mn)(Fe, Cr, Mn)_2O_4$, $Fe(Fe, Cr)_2O_4$, $(Co, Fe)(Fe, Cr)_2O_4$, $Cu(Cr, Mn)_2O_4$ and $(Ni, Co, Fe)(Fe, Cr)_2O_4$. In addition, the above-illustrated oxides and composite oxides may be used singly or in the combination of any two or more thereof to obtain molded products having desired colors.

Meanwhile, among the above-illustrated oxides and composite oxides, when CoO is used singly, the molded products produced from the composition containing CoO singly tend to suffer from occurrence of whitening on the surface thereof upon exposure to sunlight depending on intensity of infrared rays contained in the sunlight, as well as vaporization due to ultraviolet rays contained therein. Therefore, CoO is preferably used in combination with the other inorganic pigments.

In the present invention, in order to obtain molded products exhibiting dark colors such as black-based colors and deep green-based colors, as the inorganic pigment [B], there are preferably used oxides containing at least two elements selected from the group consisting of Fe, Cr and Mn. Examples of such oxides may include $Fe(Fe, Cr)_2O_4$, $(Co, Fe)(Fe, Cr)_2O_4$, $Cu(Cr, Mn)_2O_4$, $(Cu, Fe, Mn)(Fe, Cr, Mn)_2O_4$, $(Fe, Zn)(Fe, Cr)_2O_4$ and $Cr_2O_3$: $Fe_2O_3$. These oxides may be used singly or in the combination of any two or more thereof.

In order to produce the molded products exhibiting dark colors such as black-based colors and deep green-based colors, it is required that the above inorganic pigments may be contained in a total amount of preferably not less than 60% by mass, more preferably 70 to 100% by mass and still more preferably 80 to 100% by mass based on the whole amount of the inorganic pigment [B]. When the above inorganic pigments are used in an amount of less than 100% by mass, the remainder of the inorganic pigment [B] may comprise other pigments such as inorganic pigments, organic pigments and carbon black. More specifically, the inorganic pigment [B] can be effectively used in combination with the below-mentioned inorganic pigment [C] to produce molded products having desired colors. Not only the black-based or deep green-based colors but also blue-based colors, brown-based colors, etc., can be attained by using a single kind of inorganic pigment or the combination of a plurality of inorganic pigments based on three primary colors. Molded products using the conventional colorants containing the combination of organic pigments or dyes tend to undergo fading and discoloration and, therefore, tend to be deteriorated in weather resistance. Whereas, the molded products using inorganic pigments according to the present invention are free from occurrence of fading and discoloration, and can continuously exhibit a clear color inherent to the inorganic pigments.

In the case where the above-illustrated inorganic pigments are used, the contents of the thermoplastic resin [A] and the inorganic pigment [B] constituting the composition of the present invention may be controlled such that the inorganic pigment [B] is contained in an amount of 0.1 to 15 parts by mass, preferably 0.5 to 15 parts by mass, more preferably 1.0 to 10 parts by mass and especially preferably 1.0 to 7 parts by mass based on 100 parts by mass of the thermoplastic resin [A]. When the content of the inorganic pigment [B] is too small, the resultant composition tends to be deteriorated in coloring clarity. On the other hand, when the content of the inorganic pigment [B] is too large, the resultant composition tends to be deteriorated in moldability and impact resistance.

Alternatively, in another embodiment for obtaining molded products having dark colors such as black-based colors and deep green-based colors, as the inorganic pigment [B], there are preferably used oxides containing Co element and Ni element. Examples of such oxides may include $(Ni, Co, Fe)(Fe, Cr)_2O_4$, etc. These oxides may be used singly or in the combination of any two or more thereof. Also, these oxides may be used in combination with other kinds of inorganic pigments.

In addition, when the oxides containing Co element and Ni element are used as the inorganic pigment [B], the content ratio (Co/Ni) of Co element to Ni element in the composition of the present invention is preferably in the range of 5/95 to 95/5, more preferably 10/90 to 90/10 and still more preferably 15/85 to 85/15. When the content ratio (Co/Ni) lies within the above-specified range, the obtained thermoplastic resin composition becomes more excellent in dark-coloring property and low-heat accumulating property.

In order to produce the molded products exhibiting dark colors such as black-based colors and deep green-based colors, it is required that the above-illustrated inorganic pigments may be contained in a total amount of preferably not less than 15% by mass, more preferably 20 to 100% by mass and still more preferably 25 to 100% by mass based on the whole amount of the inorganic pigment [B]. When the above inorganic pigments are used in an amount of less than 100% by mass, the remainder of the inorganic pigment [B] may comprise other pigments such as inorganic pigments, organic pigments and carbon black. More specifically, the inorganic pigment [B] can be effectively used in combination with the inorganic pigment [C] as explained later to produce molded products having desired colors. Not only the black-based or deep green-based colors but also blue-based colors, brown-based colors, etc., can be attained by using a single kind of inorganic pigment or the combination of plural kinds of inorganic pigments based on three primary colors according to the color as desired.

In the case where the above-illustrated inorganic pigments are used, the contents of the thermoplastic resin [A] and the inorganic pigment [B] constituting the composition of the present invention are controlled such that the inorganic pigment [B] is contained in an amount of 0.1 to 15 parts by mass, preferably 0.5 to 15 parts by mass, more preferably 1.0 to 10 parts by mass and especially preferably 1.0 to 8 parts by mass based on 100 parts by mass of the thermoplastic resin [A]. When the content of the inorganic pigment [B] is too small, the resultant composition may fail to show a sufficiently low-heat accumulating property and tends to be deteriorated in coloring property. On the other hand, when the content of the inorganic pigment [B] is too large, the resultant composition tends to be deteriorated in moldability and impact resistance.

Meanwhile, in any of the above-mentioned embodiments, in the case where CoO is used as one component of the inorganic pigment [B], the content of CoO is preferably not more than 50% by mass, more preferably not more than 40% by mass and still more preferably not more than 30% by mass based on 100% by mass of the whole amount of the inorganic pigment. The remainder of the inorganic pigment may comprise other kinds of inorganic pigments, e.g., $Fe(Fe, Cr)_2O_4$.

As the inorganic pigment [B], in addition to the above-illustrated inorganic pigments, $TiO_2$, organic pigments, etc., which have been conventionally used as materials having an infrared-reflecting property, may be used in combination therewith.

Meanwhile, the inorganic pigment [B] is preferably in the form of a powder and more preferably in the form of fine particles. The shape of the inorganic pigment [B] is not particularly restricted, and the inorganic pigment [B] has a maximum particle length of preferably 5 nm to 40 μm and more preferably 15 nm to 30 μm. When the particle size of the inorganic pigment [B] lies in the above-specified range, the resultant composition is well-balanced between handling property and impact resistance.

The inorganic pigment [B] has such a hue that the molded product obtained from the composition comprising 100 parts by mass of a block-type polypropylene and 0.5 part by mass of the inorganic pigment [B] has an L value of preferably less than 40, more preferably 5 to 39 and still more preferably 5 to 35. When the L value is too high, it may be sometimes difficult to obtain dark-colored molded products as aimed by the present invention.

The inorganic pigment [C] used in the present invention is not particularly restricted. The inorganic pigment [C] may be constituted of an element selected from the group consisting of Fe, Cr, Mn, Co and Ni which may be contained in the above inorganic pigment [B]. The inorganic pigment [C] has such a hue that the molded product obtained from the composition comprising 100 parts by mass of a block-type polypropylene and 0.5 part by mass of the inorganic pigment [C] exhibits an L value of not less than 40. In this case, the molded products obtained from the composition comprising 100 parts by mass of a block-type polypropylene and 0.5 part by mass of the inorganic pigment [B] exhibits an L value of preferably less than 40, more preferably 5 to 39 and still more preferably 5 to 35.

Examples of the above inorganic pigment [C] may include white-based inorganic pigments, red-based inorganic pigments, green-based inorganic pigments, yellow-based inorganic pigments, brown-based inorganic pigments, blue-based inorganic pigments, violet-based inorganic pigments, silver color-based inorganic pigments and pearl color-based inorganic pigments. These inorganic pigments may be used singly or in the combination of any two or more thereof.

Examples of the white-based inorganic pigments may include ZnO, $TiO_2$, $Al_2O_3 \cdot nH_2O$, $[ZnS+BaSO_4]$, $CaSO_4 \cdot 2H_2O$, $BaSO_4$, $CaCO_3$ and $2PbCO_3 \cdot Pb(OH)_2$. These white-based inorganic pigments may be used singly or in the combination of any two or more thereof.

Examples of the red-based inorganic pigments may include $CdS \cdot nCdSe$ and $PbCrO_4 \cdot mPbMoO_4 \cdot nPbSO_4$. These red-based inorganic pigments may be used singly or in the combination of any two or more thereof.

Examples of the green-based inorganic pigments may include $Cu(C_2H_3O_2)_3$, $Cu(AsO_2)_2$, $CoO \cdot nZnO$, $BaMnO_2$, $Cu_2(OH)_2(CO_3)$ and Ti—Co—Ni—Zn-based composite oxides. These green-based inorganic pigments may be used singly or in the combination of any two or more thereof.

Examples of the yellow-based inorganic pigments may include $TiO_2 \cdot BaO \cdot NiO$, $TiO_2 \cdot NiO \cdot Sb_2O_3$, $Fe_2O_3 \cdot H_2O$, $PbCrO_4$, $Pb(SbO_3)_2$, $Pb_3(SbO_4)_2$, Ti—Sb—Ni-based composite oxides and Ti—Sb—Cr-based composite oxides. These yellow-based inorganic pigments may be used singly or in the combination of any two or more thereof.

Examples of the brown-based inorganic pigments may include $TiO_2 \cdot Sb_2O_3 \cdot NiO$, Zn—Fe-based composite oxides such as $ZnO \cdot Fe_2O_3$, and Zn—Fe—Cr-based composite oxides such as $ZnO \cdot Fe_2O_3 \cdot Cr_2O_3$. These brown-based inorganic pigments may be used singly or in the combination of any two or more thereof.

Examples of the blue-based inorganic pigments may include $CoO \cdot nAl_2O_3$, $CoO \cdot nSnO \cdot mMgO$ and $Na_6Al_6(SiO_4)_6 \cdot 2Na_3SO_4$. These blue-based inorganic pigments may be used singly or in the combination of any two or more thereof.

Examples of the violet-based inorganic pigments may include $CO_3(PO_4)_2$ and $(NH_4)_2MnO_2(P_2O_7)_2$. These violet-based inorganic pigments may be used singly or in the combination of any two or more thereof.

Examples of the silver color-based inorganic pigments may include Al powder and zinc powder. These silver color-based inorganic pigments may be used singly or in the combination of any two or more thereof.

Examples of the pearl color-based inorganic pigments may include mica, etc. These pearl color-based inorganic pigments may be used singly or in the combination of any two or more thereof.

Meanwhile, the use of the above white-based, silver color-based or pearl color-based inorganic pigments allows the resultant molded products to show a metallic appearance while maintaining the desired color thereof.

The above-illustrated inorganic pigments is preferably contained in an amount of not less than 15% by mass, more preferably 20 to 100% by mass and still more preferably 25 to 100% by mass based on the whole amount of the inorganic pigment [C]. When the inorganic pigment [C] is effectively used in combination with the inorganic pigment [B], it becomes possible to obtain molded products having a desired color.

In addition, the inorganic pigment [C] may or may not have an infrared-reflecting property. Although the use of the inorganic pigment [C] having an infrared-reflecting property is preferred, there may also be used the inorganic pigment [C] having no infrared-reflecting property.

In the low-heat accumulating thermoplastic resin composition of the present invention, the content of the inorganic pigment [C] is in the range of 0.01 to 10 parts by mass, preferably 0.01 to 8 parts by mass and more preferably 0.01 to 6 parts by mass based on 100 parts by mass of the thermoplastic resin [A]. When the content of the inorganic pigment [C] is too small, the resultant composition tends to be deteriorated in stability of color tone. On the other hand, when the content of the inorganic pigment [C] is too large, the resultant composition tends to be deteriorated in stability of color tone and impact resistance.

As the suitable combination of the inorganic pigments [B] and [C] for obtaining desired black-based molded products, there may be used combinations of the inorganic pigment [B] selected from the group consisting of Fe(Fe, $Cr)_2O_4$, (Co, Fe)(Fe, $Cr)_2O_4$, Cu(Cr, $Mn)_2O_4$, (Cu, Fe, Mn)(Fe, Cr, $Mn)_2O_4$ and (Ni, Co, Fe)(Fe, $Cr)_2O_4$, with the inorganic pigment [C] selected from the group consisting of $TiO_2$, Ti—Co—Ni—Zn-based composite oxides, $Na_6Al_6(SiO_4)_6 \cdot 2Na_3SO_4$ and Ti—Sb—Cr-based composite oxides.

As the preferred combination of the inorganic pigments [B] and [C] for obtaining desired deep green-based molded products, there may be used combinations of the inorganic pigment [B] selected from the group consisting of Fe(Fe, $Cr)_2O_4$, (Co, Fe)(Fe, $Cr)_2O_4$, Cu(Cr, $Mn)_2O_4$, (Cu, Fe, Mn)(Fe, Cr, $Mn)_2O_4$ and (Ni, Co, Fe)(Fe, $Cr)_2O_4$, with the inorganic pigment [C] selected from the group consisting of $TiO_2$, Ti—Co—Ni—Zn-based composite oxides, $Na_6Al_6(SiO_4)_6 \cdot 2Na_3SO_4$ and Ti—Sb—Cr-based composite oxides.

Further, as the preferred combination of the inorganic pigments [B] and [C] for obtaining desired dark brown-based molded products, there may be used combinations of the inorganic pigment [B] selected from the group consisting of Fe(Fe, $Cr)_2O_4$, (Co, Fe)(Fe, $Cr)_2O_4$, Cu(Cr, $Mn)_2O_4$, (Cu, Fe, Mn)(Fe, Cr, $Mn)_2O_4$ and (Ni, Co, Fe)(Fe, $Cr)_2O_4$, with the inorganic pigment [C] selected from the group consisting of $TiO_2$ and Ti—Sb—Ni-based composite oxides.

The contents of the thermoplastic resin [A], the inorganic pigment [B] and the inorganic pigment [C] constituting the low-heat accumulating thermoplastic resin composition of the present invention are controlled such that the inorganic pigment [B] is contained in an amount of 0.1 to 15 parts by mass, preferably 0.3 to 10 parts by mass and more preferably 0.5 to 8 parts by mass based on 100 parts by mass of the thermoplastic resin [A], and the inorganic pigment [C] is contained in an amount of 0.01 to 10 parts by mass, preferably 0.01 to 8 parts by mass and more preferably 0.01 to 6 parts by mass based on 100 parts by mass of the thermoplastic resin [A]. When the contents of the respective components are controlled to the above-specified ranges, it is possible to obtain dark-colored molded products having an excellent moldability and a less heat-accumulating property as well as excellent weather resistance and impact resistance.

Meanwhile, when the green-based inorganic pigment solely is used as the inorganic pigment [C], it is possible to obtain black-based or deep green-based molded products. Specific examples of such a green-based inorganic pigment may include Ti—Co—Ni—Zn-based composite oxides. When the inorganic pigment [B], e.g., (Ni, Co, Fe)(Fe, $Cr)_2O_4$, is used in combination with the above green-based inorganic pigment, it is possible to obtain molded products having a deeply dark color.

In this case, the contents of the thermoplastic resin [A], the inorganic pigment [B] and the inorganic pigment [C] are preferably controlled such that the inorganic pigment [B] is contained in an amount of 0.1 to 15 parts by mass, preferably 0.3 to 10 parts by mass and more preferably 0.5 to 8 parts by mass based on 100 parts by mass of the thermoplastic resin [A], and the inorganic pigment [C] is contained in an amount of 0.01 to 10 parts by mass, preferably 0.01 to 8 parts by mass and more preferably 0.01 to 6 parts by mass based on 100 parts by mass of the thermoplastic resin [A].

Further, in order to obtain molded products having a more deeply black color different from the black color attained by using the above green-based inorganic pigment solely, it is preferred that as the inorganic pigment [C], the green-based inorganic pigment is used in combination with the white-based inorganic pigment and the blue-based inorganic pigment. Examples of the suitable inorganic pigment [C] are as follows. That is, examples of the green-based inorganic pigment may include $Cu_2(OH)_2(CO_3)$, $Cu(C_2H_3O_2)_3$, $Cu(AsO_2)_2$ and Ti—Co—Ni—Zn-based composite oxides; examples of the white-based inorganic pigment may include $TiO_2$; and examples of the blue-based inorganic pigment may include $Na_6Al_6(SiO_4)_6 \cdot 2Na_3SO_4$. When the inorganic pigment [B] is used in combination with the green-based, white-based and blue-based inorganic pigments, the resultant molded products can exhibit a low-heat accumulating property and an excellent weather resistance.

In this case, the contents of the green-based, white-based and blue-based inorganic pigments blended may be selected so as to exhibit a desired color. Specifically, assuming that the total amount of these inorganic pigments is 100 parts by mass, the content of the green-based inorganic pigment blended is preferably in the range of 0.01 to 10 parts by mass and more preferably 0.01 to 8 parts by mass; the content of the white-based inorganic pigment blended is preferably in the range of 0.01 to 10 parts by mass and more preferably 0.01 to 8 parts by mass; and the content of the blue-based inorganic pigment blended is preferably in the range of 0.01 to 10 parts by mass and more preferably 0.01 to 8 parts by mass.

Meanwhile, the inorganic pigment [C] is preferably in the form of a powder and more preferably in the form of fine particles. The shape of the inorganic pigment [C] is not particularly restricted, and the inorganic pigment [C] has a maximum particle length of preferably 5 nm to 40 μm and more preferably 15 nm to 30 μm. When the particle size of the inorganic pigment [C] lies in the above-specified range, the resultant composition is well-balanced between handling property and impact resistance.

The resin composition of the present invention may optionally contain various additives according to requirements. Examples of the additives may include antioxidants, plasticizers, colorants, flame retardants, fillers, lubricants and antistatic agents. As the colorants, organic pigments, organic dyes, carbon black, etc., may be blended in the composition in such a range capable of keeping a heat-accumulating property of the resultant molded products at a low level.

The resin composition of the present invention may be obtained by mixing and kneading the respective components using various extruders, Banbury mixer, kneader, rolls, etc. Upon the mixing and kneading procedure, the respective components may be mixed and kneaded either at one time or by multi-stage addition method. The thus obtained resin composition may be subjected to injection molding, sheet extrusion, vacuum forming, foam molding, etc., to obtain various kinds of molded products.

The molded product obtained from the resin composition of the present invention exhibits a temperature rise of usually not more than 50° C., preferably not more than 45° C. and more preferably not more than 40° C. as measured under the following experimental conditions. By testing the molded product under the following experimental conditions, it is possible to evaluate a heat-accumulating property thereof.

[Experimental Conditions]

When a molded product produced from the composition of the present invention which has a length of 80 mm, a width of 55 mm and a thickness of 2.5 mm is placed in a chamber whose temperature and relative humidity are controlled to 25±2° C. and 50±5% RH, respectively, and a surface of the molded product is irradiated with light from a height of 200 mm above the molded product using an infrared lamp or an incandescent lamp with an output power of 100 W for 60 min, the temperature rise is defined as a difference between a temperature of the surface of the molded product as measured after the light irradiation using the infrared lamp or incandescent lamp, and an initial temperature thereof as measured before the light irradiation.

In addition, the molded product produced from the composition of the present invention preferably has a maximum light reflectance value of not less than 15%, more preferably not less than 20% and still more preferably not less than 25% as measured by irradiating light with a wavelength of 1000 to 1250 nm thereto. The upper limit of the light reflectance is usually 80%. The higher the maximum light reflectance value, the more excellent the low-heat accumulating property of the resultant molded product becomes.

The inorganic pigment [B] contained in the resin composition of the present invention shows respective colors inherent thereto. In particular, in order to obtain molded products exhibiting a color with a sufficient concentration and having an excellent coloring clarity, the inorganic pigment [B] is used in a sufficient amount relative to the thermoplastic resin [A]. However, even though the amount of the inorganic pigment [B] is used in a relatively small amount, the molded products having the above excellent properties can be obtained by increase in thickness thereof, etc.

Further, the molded product produced from the composition of the present invention preferably has an L value of not more than 40, more preferably not more than 35 and still more preferably not more than 30 when a hue of the molded product is measured and expressed according to a Lab color system. The lower limit of the L value is usually 5. When the L value becomes lower, the resultant molded product is more excellent in darkness and low-heat accumulating property.

The resin composition of the present invention is excellent in moldability, and the molded product obtained from the composition by the above molding process exhibits a less heat accumulation as well as excellent weather resistance and impact resistance and, therefore, can be suitably applied to outdoor structural members such as rain gutters, automobile interior trims or parts, duct covers for air conditioners, etc.

PREFERRED EMBODIMENTS OF THE INVENTION

The present invention is described in more detail by the following Examples, but these Examples are only illustrative and, therefore, not intended to limit the scope of the present invention thereto. Meanwhile, in the following Examples and Comparative Examples, "part" and "%" represent "part by mass" and "% by mass", respectively, unless otherwise specified. Further, various properties were measured and evaluated by the following methods.

(1) Moldability

The moldability was evaluated by a fluidity (melt flow rate) as measured according to JIS K7210. The measurement was conducted at a temperature of 220° C. under a load of 98 N, and the unit measured was g/10 min.

(2) Heat-Accumulating Property

A molded product (test piece) having a length of 80 mm, a width of 55 mm and a thickness of 2.5 mm which was obtained by molding a resin composition, was placed in a chamber whose temperature and relative humidity were controlled to 25±2° C. and 50±5% RH, respectively, and then a surface of the molded product was irradiated with light from a height of 200 mm above the molded product using an infrared lamp with an output power of 100 W. After 60 min, the surface temperature of the test piece was measured by a surface thermometer. The unit was ° C.

Further, in order to evaluate a stability for a low-heat accumulation property of the molded product, the above measurement was repeated five times to determine a difference ΔT between the maximum and minimum values of the surface temperatures obtained in the respective measurements. The measurement results were evaluated according to the following ratings.

A: ΔT was not more than 3° C.;
B: ΔT was more than 3° C. but less than 5° C.; and
C: ΔT was not less than 5° C.

(3) Impact Resistance

The impact resistance was evaluated by Izod impact strength. A test piece #2 according to JIS K7110 was molded to measure an Izod impact strength thereof. The unit measured was $kJ/m^2$.

(4) Weather Resistance

A test piece having a length of 80 mm, a width of 55 mm and a thickness of 2.5 mm was exposed to raining cycles of 18 min and 120 min at a black panel temperature of 63° C. for 1000 hours using a sunshine weatherometer manufactured by Suga Test Instruments Co., Ltd. to calculate a change ΔE in hue between before and after the exposure test.

The value ΔE was calculated according to the following formula by measuring a discoloration degree Lab (L: lightness; a: redness; and b: yellowness) using a multi-spectrocolour-meter manufactured by Suga Test Instruments Co., Ltd.

$$\Delta E = \sqrt{[(L_1-L_2)^2 + (a_1-a_2)^2 + (b_1-b_2)^2]}$$

wherein $L_1$, $a_1$ and $b_1$ are values before the exposure test; and $L_2$, $a_2$ and $b_2$ are values after the exposure test.

The lower ΔE value indicated a less change in hue, i.e., a more excellent color tone. The evaluation ratings are as follows.

A: ΔE was not more than 5;
B: ΔE was more than 5 but less than 10; and
C: ΔE was not less than 10.

(5) Coloring Clarity

The test piece having a length of 80 mm, a width of 55 mm and a thickness of 2.5 mm was visually observed. The evaluation ratings are as follows.
A: Excellent;
B: Slightly poor as compared to A; and
C: Poor.

(6) L Value

The L value of the test piece having a length of 80 mm, a width of 55 mm and a thickness of 2.5 mm was measured using a multi-spectro-colour-meter manufactured by Suga Test Instruments Co., Ltd.

(7) Reflectance

The infrared reflectance of the test piece having a length of 80 mm, a width of 55 mm and a thickness of 2.5 mm was measured using an infrared reflectance meter manufactured by Shimadzu Corporation. The wavelength range of infrared rays irradiated was from 200 to 2500 nm. The maximum value of the reflectance in a wavelength range of 1000 to 1250 nm was determined.

PRODUCTION EXAMPLE 1

Production of Rubber-Reinforced Vinyl-Based Resin (A1-1)

A glass reactor equipped with a stirrer was charged with 75 parts of ion-exchanged water, 0.5 part of potassium rosinate, 0.1 part of t-dodecyl mercaptan, 32 parts (calculated as solid content) of a polybutadiene latex (average particle size: 2700 Å; gel content: 90%), 8 parts of a styrene-butadiene copolymer latex (styrene content: 25%; average particle size: 5500 Å), 15 parts of styrene and 5 parts of acrylonitrile, and the contents of the reactor were heated under stirring in a nitrogen flow. At the time at which an inside temperature of the reactor reached 45° C., a solution prepared by dissolving 0.2 part of sodium pyrophosphate, 0.01 part of ferrous sulfate heptahydrate and 0.2 part of glucose in 20 parts of ion-exchanged water was charged into the reactor. Thereafter, 0.07 part of cumene hydroperoxide was added to the reactor to initiate polymerization of the contents in the reactor. The polymerization was continued for one hour. Then, 50 parts of ion-exchanged water, 0.7 part of potassium rosinate, 30 parts of styrene, 10 parts of acrylonitrile, 0.05 part of t-dodecyl mercaptan and 0.01 part of cumene hydroperoxide were continuously added to the reactor for 3 hours. After the contents of the reactor were polymerized for one hour, 0.2 part of 2,2'-methylene-bis(4-ethylene-6-t-butyl phenol) was added to the reactor to complete the polymerization. The resultant latex as a reaction product was solidified, washed with water and then dried to obtain a rubber-reinforced vinyl-based resin (A1-1). It was confirmed that the resultant resin had a graft percentage of 72%, and an acetone insoluble component thereof had an intrinsic viscosity [η] of 0.47 dL/g.

PRODUCTION EXAMPLE 2

Production of Rubber-Reinforced Vinyl-Based Resin (A1-2)

First, 73 parts of styrene and 27 parts of acrylonitrile were mixed with each other to prepare a mixture of the monomers. A glass reactor equipped with a stirrer was charged with 100 parts (calculated as solid content) of an acrylic rubber polymer latex having a weight-average particle size of 284 nm which was obtained by subjecting 99 parts of n-butyl acrylate and 1 part of allyl methacrylate to emulsion polymerization, and 110 parts of ion-exchanged water, and the contents of the reactor were heated under stirring in a nitrogen flow. At the time at which an inside temperature of the reactor reached 40° C., 86% of an aqueous solution prepared by dissolving 1.2 parts of sodium pyrophosphate and 0.3 part of glucose in 20 parts of ion-exchanged water (hereinafter referred to merely as "RED aqueous solution") and 30% of an aqueous solution prepared by dissolving 0.4 part of t-butyl hydroperoxide and 2.4 parts of disproportionated potassium rosinate in 30 parts of ion-exchanged water (hereinafter referred to merely as "CAT aqueous solution") were charged into the reactor. Immediately after the addition, the above-prepared monomer mixture and the remainder of the CAT aqueous solution were continuously added to the reactor for 3 hours and for 3 hours and 30 minutes, respectively, to initiate polymerization of the contents in the reactor. From initiation of the polymerization, the contents were heated until reaching 75° C., and then kept at 75° C. After 180 min from initiation of the polymerization, the remaining 14% of the RED aqueous solution was charged into the reactor. After the contents of the reactor was held at the same temperature for 60 min, the polymerization was terminated, thereby producing a rubber-reinforced vinyl-based resin (A1-2) in the same manner as the above (A1-1). As a result, it was confirmed that the resultant resin had a graft percentage of 50%, and an acetone insoluble component thereof had an intrinsic viscosity [η] of 0.45 dL/g.

PRODUCTION EXAMPLE 3

Production of Rubber-Reinforced Vinyl-Based Resin (A1-3)

A stainless steel autoclave equipped with a ribbon-type stirrer, a continuous assistant feeder and a thermometer was charged with 20 parts of an ethylene-propylene-based rubber polymer (tradename: "EP84" produced by JSR Corporation), 56 parts of styrene, 24 parts of acrylonitrile and 110 parts of toluene, and an inside temperature of the autoclave was raised to 75° C. at which the contents of the autoclave were stirred for one hour to prepare a uniform solution. Thereafter, 0.45 part of t-butylperoxyisopropyl carbonate was added to the autoclave, and the inside temperature of the autoclave was further raised to 100° C. Then, while maintaining the inside temperature of the autoclave at 100° C., the contents thereof were subjected to polymerization reaction at a stirring speed of 100 rpm. After the elapse of 4 hours from initiation of the polymerization reaction, the inside temperature of the autoclave was raised to 120° C. While maintaining the same temperature, the contents of the autoclave were further reacted for 2 hours, and then the polymerization reaction was terminated. It was confirmed that the resultant product had a graft percentage of 55%. Next, after the inside temperature of the autoclave was cooled to 100° C., 0.2 part of octadecyl-3-(3,5-di-t-butyl-4-hydroxyphenol)-propionate was added thereto. The contents of the autoclave were withdrawn therefrom, and subjected to steam distillation to remove unreacted substances and solvents therefrom. Then, the obtained product was treated using a 40 mmφ vented extruder at a cylinder temperature of 220° C. and a vacuum degree of 700 mmHg to vaporize substantially all of volatile components, and extruded therefrom to form pellets thereof. As a result, it was confirmed that the resultant rubber-reinforced vinyl-based resin (A1-3) had a graft percentage of 55%, and an acetone insoluble component thereof had an intrinsic viscosity [η] of 0.5 dL/g.

PRODUCTION EXAMPLE 4

Production of Copolymer (A2)

75 parts of styrene and 25 parts of acrylonitrile were subjected to bulk polymerization to obtain a vinyl-based polymer (A2-1). It was confirmed that the obtained polymer had an intrinsic viscosity [η] of 0.45 dL/g.

In the following Examples and Comparative Examples, the following colorants were used.

(1) Inorganic Pigment (B)

B-1: Composite oxide of Fe and Cr; tradename "FERRO COLOR 42-703A" produced by Nippon Ferro Co., Ltd.; chemical composition: $Cr_2O_3$: 88 to 91%, $Fe_2O_3$: 7 to 10%; color: black)

B-2: Composite oxide of Fe and Mn; tradename "FERRO COLOR 42-350A" produced by Nippon Ferro Co., Ltd.

B-3: Composite oxide of Cu, Cr and Mn; tradename "FERRO COLOR 42-303B" produced by Nippon Ferro Co., Ltd.

B-4: Composite oxide of Ni, Co, Fe and Cr; tradename "AE801 BLACK" produced by Kawamura Chemical Co., Ltd.

(2) Inorganic Pigment (C)

C-1: $TiO_2$; tradename "CR-60-2" produced from Ishihara Sangyo Kaisha Ltd.

C-2: Ti—Cr—Ni—Zn-based composite oxide; tradename "MD100" produced by Kawamura Chemical Co., Ltd.

C-3: Ultramarine blue; tradename "NUB1FLOW" produced by Tokyo Shin-Nippon Kasei Co., Ltd.

C-4: Ti—Sb—Ni-based composite oxide; tradename "BR100" produced by Kawamura Chemical Co., Ltd.

(3) Organic Pigment [D], etc.

D-1: Perylene-based organic pigment; tradename "Paliogen Red 3911HD" produced by BASF Japan Ltd.

D-2: Isoindoline-based organic pigment; tradename "DISCOALL 443" produced by Dainichiseika Color & Chemicals Mfg. Co., Ltd.

D-3: Cyanine-based organic pigment; tradename "Sumitone Cyanine Blue GH" produced by Sumitomo Chemical Co., Ltd.

D-4: Carbon black

Meanwhile, in order to examine an L value of a molded product containing the above inorganic pigment [B] or [C], a composition comprising 100 parts of a block-type polypropylene (tradename "BC6C" produced by Japan Polychem Corporation) and 0.5 part of the above inorganic pigment [B] or [C] was prepared. A molded product was produced from the composition to measure an L value thereof. The results are shown in Table 1.

TABLE 1

|         | B-1 | B-2 | B-3 | B-4 | C-1 | C-2 | C-3 | C-4 |
|---------|-----|-----|-----|-----|-----|-----|-----|-----|
| L value | 22  | 25  | 23  | 23  | 75  | 48  | 66  | 46  |

EXAMPLES 1 TO 9 AND COMPARATIVE EXAMPLES 1 TO 5

The respective components were mixed together at mixing ratios as shown in Tables 1 and 2 using a mixer for 3 min, and then melt-kneaded by a 50 mmφ extruder at a cylinder set temperature of 180 to 200° C. and then extruded therefrom, thereby obtaining pellets. The thus obtained pellets were fully dried to obtain a test piece for evaluation. Various properties of the thus obtained test piece were evaluated by the above-mentioned methods. The evaluation results are shown in Tables 2 and 3.

TABLE 2

|  | Examples ||||||||
|---|---|---|---|---|---|---|---|
|  | 1 | 2 | 3 | 4 | 5 | 6 | 7 |
| Thermoplastic resin | | | | | | | |
| A1-1 | 50 | 50 | 50 | — | — | 50 | 50 |
| A1-2 | — | — | — | 40 | — | — | — |
| A1-3 | — | — | — | — | 100 | — | — |
| A2-1 | 50 | 50 | 50 | 60 | — | 50 | 50 |
| Inorganic pigment [B] | | | | | | | |
| B-1 | 2 | 5 | 2.8 | 2 | 2 | — | — |
| B-2 | — | — | 0.2 | — | — | 2 | — |
| B-3 | — | — | — | — | — | — | 2 |
| B-4 | — | — | — | — | — | — | — |
| Organic pigment [D] | | | | | | | |
| D-1 | — | — | — | — | — | — | — |
| D-2 | — | — | — | — | — | — | — |
| D-3 | — | — | — | — | — | — | — |
| D-4 | — | — | — | — | — | — | — |
| Co/Ni ratio derived from inorganic pigment | — | — | — | — | — | — | — |
| Evaluation | | | | | | | |
| Color of molded product | B* | B* | B* | B* | B* | B* | B* |
| Moldability (g/10 min) | 17 | 18 | 17 | 18 | 18 | 17 | 18 |
| Heat-accumulating property | 58 | 51 | 53 | 55 | 53 | 53 | 54 |
| Impact resistance ($kJ/m^2$) | 24 | 22 | 22 | 23 | 25 | 22 | 23 |
| L value | 25 | 10 | 15 | 23 | 28 | 30 | 32 |
| Reflectance (%) | 17 | 28 | 22 | 16 | 18 | 20 | 20 |
| Weather resistance | A | A | A | A | A | A | A |
| Coloring clarity | A | A | A | A | A | A | A |

Note
B*: Black-based color

TABLE 3

|  | Examples || Comparative Examples ||||
|---|---|---|---|---|---|---|
|  | 8 | 9 | 1 | 2 | 3 | 4 | 5 |
| Thermoplastic resin | | | | | | | |
| A1-1 | 50 | 50 | 50 | 50 | — | — | — |
| A1-2 | — | — | — | — | 40 | 40 | — |
| A1-3 | — | — | — | — | — | — | 100 |
| A2-1 | 50 | 50 | 50 | 50 | 60 | 60 | — |
| Inorganic pigment [B] | | | | | | | |
| B-1 | — | — | — | — | — | — | — |
| B-2 | — | — | — | — | — | — | — |
| B-3 | — | — | — | — | — | — | — |
| B-4 | 3 | 5 | — | — | — | — | — |
| Organic pigment [D] | | | | | | | |
| D-1 | — | — | 0.15 | — | — | 0.15 | — |
| D-2 | — | — | — | 0.2 | — | — | — |

TABLE 3-continued

|  | Examples | | Comparative Examples | | | | |
|---|---|---|---|---|---|---|---|
|  | 8 | 9 | 1 | 2 | 3 | 4 | 5 |
| D-3 | — | — | — | 0.25 | — | 0.25 | — |
| D-4 | — | — | 0.3 | — | 0.3 | — | 0.3 |
| Co/Ni ratio derived from inorganic pigment | 50/50 | 50/50 | — | — | — | — | — |
| Evaluation | | | | | | | |
| Color of molded product | B* | B* | B* | B* | B* | B* | B* |
| Moldability (g/10 min) | 18 | 18 | 16 | 18 | 16 | 18 | 16 |
| Heat-accumulating property | 53 | 50 | 80 | 57 | 80 | 57 | 81 |
| Impact resistance (kJ/m$^2$) | 22 | 21 | 21 | 22 | 20 | 20 | 20 |
| L value | 16 | 13 | 16 | 23 | 14 | 26 | 18 |
| Reflectance (%) | 25 | 32 | 2 | 26 | 3 | 27 | 1 |
| Weather resistance | A | A | A | C | A | B | A |
| Coloring clarity | A | A | A | B | A | C | A |

Note
B*: Black-based color

From Table 3, it was confirmed that in Comparative Examples 1, 3 and 5 using carbon black as the colorant, the resultant compositions were excellent in weather resistance and coloring clarity, but all deteriorated in heat-accumulating property since the increased temperatures thereof (heat-accumulating property: as measured by heating from 25° C.) were as high as 55° C., 55° C. and 56° C., respectively. Also, it was confirmed that in Comparative Examples 2 and 4 using organic pigments for coloring, the resultant compositions were satisfactory in heat-accumulating property, but deteriorated in weather resistance and coloring clarity.

On the other hand, it was confirmed that all of the compositions obtained in Examples 1 to 9 as shown in Table 1 were well-balanced between moldability, heat-accumulating property, impact resistance, weather resistance and coloring clarity.

Meanwhile, the present invention is not limited to the above Examples, and various other modifications are possible according to objects and applications. Since the resin composition of the present invention is composed of the specific thermoplastic resin [A] and the specific inorganic pigment [B], although the thermoplastic resin and the inorganic pigment may be prepared separately or independently as described in the above Examples, a composite thermoplastic resin obtained by coating the rubber polymer with a polymer of the grafted vinyl-based monomer component and the inorganic pigment may also be used as the raw material thereof. Alternatively, there may also be used a (co)polymer coated with the inorganic pigment which is obtained by synthesizing the (co)polymer of the vinyl-based monomer component in the presence of the inorganic pigment.

EXAMPLES 10 TO 17, COMPARATIVE EXAMPLES 6 AND 7, AND REFERENCE EXAMPLES 1 TO 5

The respective components were mixed together at mixing ratios as shown in Tables 4 to 7 using a mixer for 3 min, and then melt-kneaded by a 50 mmΦ extruder at a cylinder set temperature of 180 to 200° C. and extruded therefrom, thereby obtaining pellets. The thus obtained pellets were fully dried to obtain a test piece for evaluation. Various properties of the thus obtained test piece were evaluated by the above-mentioned methods. The evaluation results are shown in Tables 4 to 7.

TABLE 4

|  | Examples | | | |
|---|---|---|---|---|
|  | 10 | 11 | 12 | 13 |
| Thermoplastic resin | | | | |
| A1-1 | 50 | — | — | — |
| A1-2 | — | 40 | — | 40 |
| A1-3 | — | — | 100 | — |
| A2-1 | 50 | 60 | — | 60 |
| Inorganic pigment [B] | | | | |
| B-1 | — | — | — | — |
| B-2 | — | — | — | — |
| B-3 | — | — | — | — |
| B-4 | 4.0 | 4.0 | 4.0 | 4.0 |
| Inorganic pigment [C] | | | | |
| C-1 | 0.2 | 0.2 | 0.2 | — |
| C-2 | 0.4 | 0.4 | 0.4 | 0.4 |
| C-3 | 0.3 | 0.3 | 0.3 | — |
| C-4 | — | — | — | — |
| Co/Ni ratio derived from inorganic pigment | 70/30 | 70/30 | 70/30 | 70/30 |
| Evaluation | | | | |
| Color of molded product | B* | B* | B* | B* |
| Moldability (g/10 min) | 17 | 20 | 18 | 19 |
| Heat-accumulating property | | | | |
| Temperature (° C.) | 53 | 52 | 50 | 55 |
| Stability | A | A | A | A |
| Impact resistance (kJ/m$^2$) | 24 | 22 | 23 | 24 |
| L value | 23 | 22 | 21 | 20 |
| Reflectance (%) | 37 | 38 | 38 | 36 |
| Weather resistance | A | A | A | A |
| Coloring clarity | A | A | A | A |

Note
B*: Black-based color

TABLE 5

|  | Examples | | | |
|---|---|---|---|---|
|  | 14 | 15 | 16 | 17 |
| Thermoplastic resin | | | | |
| A1-1 | — | — | — | — |
| A1-2 | 40 | 40 | 40 | 40 |
| A1-3 | — | — | — | — |
| A2-1 | 60 | 60 | 60 | 60 |
| Inorganic pigment [B] | | | | |
| B-1 | 2.0 | — | — | — |
| B-2 | 1.0 | — | — | — |
| B-3 | — | 3.0 | — | — |
| B-4 | — | — | 1.0 | 7.0 |
| Inorganic pigment [C] | | | | |
| C-1 | 0.5 | 0.1 | 0.2 | 0.2 |
| C-2 | 0.4 | 1.5 | 0.2 | 0.2 |
| C-3 | 1.0 | — | — | 0.2 |
| C-4 | 0.2 | — | 0.2 | — |
| Co/Ni ratio derived from inorganic pigment | 90/5 | 100/0 | 80/20 | 70/30 |
| Evaluation | | | | |
| Color of molded product | B* | B* | B* | B* |

TABLE 5-continued

|  | Examples | | | |
|---|---|---|---|---|
|  | 14 | 15 | 16 | 17 |
| Moldability (g/10 min) | 18 | 19 | 20 | 17 |
| Heat-accumulating property |  |  |  |  |
| Temperature (° C.) | 54 | 55 | 54 | 50 |
| Stability | A | A | A | A |
| Impact resistance (kJ/m$^2$) | 21 | 23 | 22 | 20 |
| L value | 30 | 26 | 33 | 15 |
| Reflectance (%) | 30 | 31 | 27 | 41 |
| Weather resistance | A | A | A | A |
| Coloring clarity | A | A | A | A |

Note
B*: Black-based color

TABLE 6

|  | Ref. Ex. | | Com. Ex. | |
|---|---|---|---|---|
|  | 1 | 2 | 6 | 7 |
| Thermoplastic resin |  |  |  |  |
| A1-1 | — | — | — | — |
| A1-2 | 40 | 40 | — | 40 |
| A1-3 | — | — | 100 | — |
| A2-1 | 60 | 60 | — | 60 |
| Inorganic pigment [B] |  |  |  |  |
| B-1 | — | — | — | — |
| B-2 | — | — | — | — |
| B-3 | — | — | — | — |
| B-4 | 3.0 | 3.0 | — | 0.08 |
| Inorganic pigment [C] |  |  |  |  |
| C-1 | — | — | — | 0.3 |
| C-2 | — | — | — | 0.1 |
| C-3 | — | — | — | 0.4 |
| C-4 | — | — | — | — |
| Organic pigment [D] |  |  |  |  |
| D-1 | — | 0.3 | 0.15 | — |
| D-2 | — | — | 0.2 | — |
| D-3 | — | — | 0.25 | — |
| D-4 | 0.5 | 0.5 | — | — |
| Co/Ni ratio derived from inorganic pigment | 70/30 | 70/30 | — | 50/50 |
| Evaluation |  |  |  |  |
| Color of molded product | B* | B* | B* | B* |
| Moldability (g/10 min) | 17 | 20 | 19 | 22 |
| Heat-accumulating property |  |  |  |  |
| Temperature (° C.) | 80 | 79 | 58 | 70 |
| Stability | A | A | A | B |
| Impact resistance (kJ/m$^2$) | 21 | 19 | 22 | 23 |
| L value | 15 | 13 | 24 | 50 |
| Reflectance (%) | 3 | 2 | 35 | 17 |
| Weather resistance | A | B | C | A |
| Coloring clarity | A | C | C | A |

Note
B*: Black-based color

TABLE 7

|  | Reference Examples | | |
|---|---|---|---|
|  | 3 | 4 | 5 |
| Thermoplastic resin |  |  |  |
| A1-1 | — | — | — |
| A1-2 | 40 | 40 | 40 |
| A1-3 | — | — | — |
| A2-1 | 60 | 60 | 60 |
| Inorganic pigment [B] |  |  |  |
| B-1 | — | — | 2.1 |
| B-2 | — | — | 1.0 |
| B-3 | — | — | — |
| B-4 | 3.0 | 2.0 | — |
| Inorganic pigment [C] |  |  |  |
| C-1 | 11 | — | — |
| C-2 | 0.2 | — | — |
| C-3 | 0.2 | — | — |
| C-4 | — | — | — |
| Organic pigment [D] |  |  |  |
| D-1 | — | — | — |
| D-2 | — | — | — |
| D-3 | — | — | — |
| D-4 | — | — | 0.3 |
| Co/Ni ratio derived from inorganic pigment | 70/30 | 70/30 | — |
| Evaluation |  |  |  |
| Color of molded product | B* | B* | B* |
| Moldability (g/10 min) | 25 | 26 | 16 |
| Heat-accumulating property |  |  |  |
| Temperature (° C.) | 51 | 50 | 80 |
| Stability | B | C | B |
| Impact resistance (kJ/m$^2$) | 12 | 22 | 19 |
| L value | 53 | 30 | 18 |
| Reflectance (%) | 36 | 35 | 1 |
| Weather resistance | A | A | A |
| Coloring clarity | A | A | A |

Note
B*: Black-based color

As is apparent from Table 6, in Comparative Example 6 using the organic pigment solely as a colorant without the inorganic pigments [B] and [C], the resultant composition had an excellent temperature rise, i.e., 33° C. (58–25=33), but was deteriorated in weather resistance and coloring clarity. In Reference Examples 1, 2 and 5 using the compositions containing the inorganic pigment [B] but no inorganic pigment [C], the increased temperatures were as high as 55° C., 54° C. and 55° C., respectively. In Reference Example 2 using the composition containing an organic pigment, the resultant composition was insufficient in weather resistance and deteriorated in coloring clarity. In Reference Example 5, the resultant composition was insufficient in stability of low-accumulating property. In Reference Example 4 using the composition containing the inorganic pigment [B] but no inorganic pigment [C], the resultant composition showed a low temperature rise and a high reflectance, but deteriorated in stability of low-heat accumulating property. In Comparative Example 7 in which the content of the inorganic pigment [B] was as small as 0.8 part, the resultant composition exhibited an L value as high as 50, and was insufficient in stability of low-heat accumulating property. In Reference Example 3 in which the total content of the inorganic pigment [C] was as large as 11.4 parts, the resultant composition showed an L value as high as 53 and was deteriorated in impact resistance.

On the other hand, as is apparent from Tables 4 and 5, in Examples 10 to 17, the resultant compositions exhibited a good temperature rise ranging from 25 to 30° C., i.e., a sufficiently stable low-heat accumulating property, and an L value as low as 15 to 33, and were excellent in weather resistance and coloring clarity.

Meanwhile, the present invention is not limited to the above Examples, and various other modifications are possible according to objects and applications. Since the resin composition of the present invention is composed of the specific thermoplastic resin [A] and the specific inorganic pigments [B] and [C], although the thermoplastic resin and the inorganic pigments may be prepared separately or independently as described in the above Examples, a composite thermoplastic resin obtained by coating the rubber polymer with a polymer of the grafted vinyl-based monomer component and the inorganic pigments may also be used as the raw material. Alternatively, there may also be used a (co)polymer coated with the inorganic pigments which is obtained by synthesizing the (co)polymer of the vinyl-based monomer component in the presence of the inorganic pigments.

Also, although it is not involved in the scope of the present invention, such an inorganic pigment having no infrared-reflecting property (hereinafter referred to merely as "inorganic pigment D") which satisfies the requirement that a molded product composed of 100 parts by mass of a block-type polypropylene and 0.5 part by mass of the inorganic pigment [D] exhibits an L value of, for example, less than 40 and preferably not more than 35, can be used instead of the inorganic pigment [C] as those usable in combination with the inorganic pigment [B], thereby obtaining a low-heat accumulating thermoplastic resin composition exhibiting an excellent moldability and being capable of providing a dark-colored molded product having a less heat accumulation as well as excellent weather resistance and impact resistance. In this case, the contents of the thermoplastic resin [A], the inorganic pigment [B] and the inorganic pigment [D] may be controlled to the same ranges as specified in the composition composed of the thermoplastic resin [A], the inorganic pigment [B] and the inorganic pigment [C].

INDUSTRIAL APPLICABILITY

The low-heat accumulating thermoplastic resin composition of the present invention is excellent in moldability upon molding thereof, and the molded product produced therefrom can accurately realize a desired color as well as can exhibit a stably less heat absorption, and is free from occurrence of deformation or shrinkage. Further, the molded product is excellent in weather resistance and impact resistance. In particular, in the case where the compound containing at least one element selected from the group consisting of Fe, Cr, Mn, Cu, Co and Ni is used as the inorganic pigment [B], the well-balanced dark coloration can be attained when used in combination with the inorganic pigment [C], and further the resultant molded product is excellent in low-heat accumulating property. Among these elements, when Co element and Ni element are used in the form of an oxide, and the content ratio of the Co element to the Ni element (CO/Ni) in the composition is in the range of 5/95 to 95/5, it is possible to obtain a clear dark-colored molded product exhibiting an excellent low-heat accumulating property and an L value as low as not more than 40.

In addition, in the case where the molded product produced from the composition has a maximum reflectance value of not less than 15% upon being irradiated with light having a wavelength of 1000 to 1250 nm, the resultant composition is regarded as an excellent low-heat accumulating thermoplastic resin composition.

When the thermoplastic resin [A] is composed of the rubber-reinforced vinyl-based resin (A1) obtained by polymerizing the vinyl-based monomer component (b) in the presence of the rubber polymer (a), or a mixture of the rubber-reinforced vinyl-based resin (A1) and a (co)polymer (A2) of a vinyl-based monomer component, the resultant composition can exhibit an especially excellent moldability and a less heat-accumulating property, and can provide a molded product having excellent weather resistance and impact resistance. Further, when the above vinyl-based monomer component contains an aromatic compound, the resultant composition is also excellent in moldability and surface appearance.

Furthermore, the molded product of the present invention can exhibit a less heat absorption as well as a less occurrence of deformation or shrinkage upon exposure to high temperature condition, and further have excellent weather resistance and impact resistance.

As described above, the low-heat accumulating thermoplastic resin composition and the molded product according to the present invention have high industrial values.

The invention claimed is:

1. A low-heat accumulating thermoplastic resin composition comprising 100 parts by mass of
   a thermoplastic resin [A],
   0.1 to 15 parts by mass of an inorganic pigment [B] having an infrared-reflecting property which is a composite oxide of Ni, Co, Fe and Cr, and
   0.01 to 10 parts by mass of an inorganic pigment [C] based on 100 parts by mass of the thermoplastic resin [A],
   wherein said inorganic pigment [B] satisfies such a requirement that a molded product comprising 100 parts by mass of a block-type polypropylene and 0.5 part by mass of the inorganic pigment [B] exhibits an L value of less than 40, and said inorganic pigment [C] satisfies such a requirement that a molded product comprising 100 parts by mass of a block-type polypropylene and 0.5 part by mass of the inorganic pigment [C] exhibits an L value of not less than 40,
   wherein a molded product produced from the composition exhibits an L value of not more than 40 when a hue of the molded product is represented by a Lab color system, and
   wherein said composition satisfies such a requirement that when a molded product produced from the composition which has a length of 80 mm, a width of 55 mm and a thickness of 2.5 mm is placed in a chamber whose temperature and relative humidity are controlled to 25±2° C. and 50±5% RH, respectively, and a surface of the molded product is irradiated with light from a height of 200 mm above the molded product using an infrared lamp with an output power of 100 W for 60 min, a temperature rise thereof is not more than 50° C., said temperature rise being defined as a difference between a temperature of the surface of the molded product as measured after the light irradiation and an initial temperature thereof as measured before the light irradiation.

2. A low-heat accumulating thermoplastic resin composition according to claim 1, wherein said thermoplastic resin [A] is a rubber-reinforced vinyl-based resin (A1) produced by polymerizing a vinyl-based monomer component (b) in the presence of a rubber polymer (a), or a mixture of the rubber-reinforced vinyl-based resin (A1) and a (co)polymer (A2) of a vinyl-based monomer component.

3. A low-heat accumulating thermoplastic resin composition according to claim 1, wherein said thermoplastic resin [A] contains the rubber polymer (a) in an amount of 3 to 40% by weight.

4. A low-heat accumulating thermoplastic resin composition according to claim 1, wherein said vinyl-based monomer component contains an aromatic vinyl compound.

5. A low-heat accumulating thermoplastic resin composition according to claim 1, wherein said inorganic pigment [B] has a Co/Ni ratio in the range of 5/95 to 95/5.

6. A low-heat accumulating thermoplastic resin composition according to claim 1, wherein said inorganic pigment [C] is at least one pigment selected from the group consisting of white-based inorganic pigments, red-based inorganic pigments, green-based inorganic pigments, yellow-based inorganic pigments, brown-based inorganic pigments, blue-based inorganic pigments, violet-based inorganic pigments, silver color-based inorganic pigments and pearl color-based inorganic pigments.

7. A low-heat accumulating thermoplastic resin composition according to claim 6, wherein said inorganic pigment [C] is a green-based inorganic pigment.

8. A low-heat accumulating thermoplastic resin composition according to claim 7, wherein said inorganic pigment [C] further includes a white-based inorganic pigment and a blue-based inorganic pigment.

9. A low-heat accumulating thermoplastic resin composition according to claim 1, wherein a molded product produced from the composition exhibits a maximum reflectance value of not less than 15% as measured by irradiating the molded product with light having a wavelength of 1000 to 1250 nm.

10. A molded product comprising the low-heat accumulating thermoplastic resin composition as defined in claim 1.

11. A low-heat accumulating thermoplastic resin composition comprising 100 parts by mass of
  a thermoplastic resin [A] composed of a rubber-reinforced vinyl-based resin (A1) containing an aromatic vinyl compound produced by polymerizing a vinyl-based monomer component (b) in the presence of a rubber polymer (a) in an amount of 3 to 40% by weight, or a mixture of the rubber-reinforced vinyl-based resin (A1) and a (co)polymer (A2) of a vinyl-based monomer component,
  0.1 to 15 parts by mass of an inorganic pigment [B] having an infrared-reflecting property which is a composite oxide of Ni, Co, Fe and Cr, and
  0.01 to 10 parts by mass of an inorganic pigment [C] based on 100 parts by mass of the thermoplastic resin [A],
  wherein said inorganic pigment [B] satisfies such a requirement that a molded product comprising 100 parts by mass of a block-type polypropylene and 0.5 part by mass of the inorganic pigment [B] exhibits an L value of less than 40, and said inorganic pigment [C] satisfies such a requirement that a molded product comprising 100 parts by mass of a block-type polypropylene and 0.5 part by mass of the inorganic pigment [C] exhibits an L value of not less than 40,
  wherein a molded product produced from the composition exhibits an L value of not more than 40 when a hue of the molded product is represented by a Lab color system,
  wherein said composition satisfies such a requirement that when a molded product produced from the composition which has a length of 80 mm, a width of 55 mm and a thickness of 2.5 mm is placed in a chamber whose temperature and relative humidity are controlled to 25±2° C. and 50±5% RH, respectively, and a surface of the molded product is irradiated with light from a height of 200 mm above the molded product using an infrared lamp with an output power of 100 W for 60 min, a temperature rise thereof is not more than 50° C., said temperature rise being defined as a difference between a temperature of the surface of the molded product as measured after the light irradiation and an initial temperature thereof as measured before the light irradiation.

12. A low-heat accumulating thermoplastic resin composition according to claim 11, wherein said inorganic pigment [B] has a Co/Ni ratio in the range of 5/95 to 95/5.

13. A low-heat accumulating thermoplastic resin composition according to claim 11, wherein said inorganic pigment [C] is at least one pigment selected from the group consisting of white-based inorganic pigments, red-based inorganic pigments, green-based inorganic pigments, yellow-based inorganic pigments, brown-based inorganic pigments, blue-based inorganic pigments, violet-based inorganic pigments, silver color-based inorganic pigments and pearl color-based inorganic pigments.

14. A low-heat accumulating thermoplastic resin composition according to claim 13, wherein said inorganic pigment [C] is a green-based inorganic pigment.

15. A low-heat accumulating thermoplastic resin composition according to claim 14, wherein said inorganic pigment [C] further includes a white-based inorganic pigment and a blue-based inorganic pigment.

16. A low-heat accumulating thermoplastic resin composition according to claim 11, wherein a molded product produced from the composition exhibits a maximum reflectance value of not less than 15% as measured by irradiating the molded product with light having a wavelength of 1000 to 1250 nm.

17. A molded product comprising the low-heat accumulating thermoplastic resin composition as defined in claim 11.

18. A low-heat accumulating thermoplastic resin composition comprising 100 parts by mass of
  a thermoplastic resin [A] and
  0.1 to 15 parts by mass of an inorganic pigment [B] having an infrared-reflecting property which is a composite oxide of Ni, Co, Fe and Cr, and
  wherein a molded product produced from the composition exhibits an L value of not more than 40 when a hue of the molded product is represented by a Lab color system, and
  wherein said composition satisfies such a requirement that when a molded product produced from the composition which has a length of 80 mm, a width of 55 mm and a thickness of 2.5 mm is placed in a chamber whose temperature and relative humidity are controlled to 25±2° C. and 50±5% RH, respectively, and a surface of the molded product is irradiated with light from a height of 200 mm above the molded product using an infrared lamp with an output power of 100 W for 60 min, a temperature rise thereof is not more than 50° C., said temperature rise being defined as a difference between a temperature of the surface of the molded product as measured after the light irradiation and an initial temperature thereof as measured before the light irradiation.

19. A low-heat accumulating thermoplastic resin composition according to claim 18, wherein said thermoplastic resin [A] is a rubber-reinforced vinyl-based resin (A1) produced by polymerizing a vinyl-based monomer component (b) in the presence of a rubber polymer (a), or a mixture of the rubber-reinforced vinyl-based resin (A1) and a (co)polymer (A2) of a vinyl-based monomer component.

20. A low-heat accumulating thermoplastic resin composition according to claim 18, wherein said thermoplastic resin [A] contains the rubber polymer (a) in an amount of 3 to 40% by weight.

21. A low-heat accumulating thermoplastic resin composition according to claim 18, wherein said vinyl-based monomer component contains an aromatic vinyl compound.

22. A low-heat accumulating thermoplastic resin composition according to claim 18, wherein said inorganic pigment [B] has a Co/Ni ratio in the range of 5/95 to 95/5.

23. A molded product comprising the low heat accumulating thermoplastic resin composition as defined in claim 18.

* * * * *